United States Patent [19]

Sedziol et al.

[11] Patent Number: 5,102,050

[45] Date of Patent: Apr. 7, 1992

[54] DIVERGENT FLAP ACTUATION SYSTEM FOR TWO-DIMENSIONAL CONVERGENT-DIVERGENT TURBOJET EXHAUST NOZZLE

[75] Inventors: Roland S. Sedziol, Cincinnati; Stephen J. Szpunar, West Chester, both of Ohio

[73] Assignee: General Electric Company, Cincinnati, Ohio

[21] Appl. No.: 644,153

[22] Filed: Jan. 22, 1991

[51] Int. Cl.⁵ .............................. B64C 15/02
[52] U.S. Cl. .................... 239/265.35; 239/265.37; 74/104
[58] Field of Search ............ 239/265.19, 265.33, 239/265.35, 265.37, 265.39; 244/12.5, 23 D, 52, 110 B, 75 R; 74/104, 102, 101, 105

[56] References Cited

U.S. PATENT DOCUMENTS

| | | |
|---|---|---|
| 2,427,980 | 9/1947 | Stinson et al. . |
| 2,448,712 | 9/1948 | Hampshire . |
| 2,910,829 | 11/1959 | Meyer . |
| 3,180,591 | 4/1965 | Ikeda et al. ............... 74/105 |
| 3,442,455 | 5/1969 | Smale . |
| 3,592,389 | 7/1971 | Johnson . |
| 3,599,875 | 8/1971 | Wynosky et al. ............ 239/265.37 |
| 3,610,556 | 10/1971 | Charlton, Jr. . |
| 3,685,738 | 8/1972 | Leibach et al. . |
| 3,786,992 | 1/1974 | Robinson . |
| 3,899,133 | 8/1975 | Camboulives et al. . |
| 4,000,854 | 1/1977 | Konarski et al. . |
| 4,013,226 | 3/1977 | Willard . |
| 4,049,199 | 9/1977 | Nightingale ............... 239/265.39 |
| 4,131,252 | 12/1978 | Dean et al. . |
| 4,141,501 | 2/1979 | Nightingale . |
| 4,392,615 | 7/1983 | Madden . |
| 4,564,160 | 1/1986 | Vermilye . |
| 4,587,806 | 5/1986 | Madden . |
| 4,884,748 | 12/1989 | Ward et al. ............... 239/265.37 |

Primary Examiner—Andres Kashnikow
Assistant Examiner—Karen B. Merritt
Attorney, Agent, or Firm—Jerome C. Squillaro; Bernard E. Shay

[57] ABSTRACT

A pair of linear actuators is disposed within a gas turbojet engine exhaust nozzle for actuating a pivotable truss frame which in turn actuates a divergent flap. One end of each actuator is pivotally mounted to a fixed structural support within the exhaust nozzle while the other end of each actuator is pivotally mounted to the truss frame. Rollers mounted to the truss frame transmit actuation forces from the actuators to the divergent flap without transmitting parasitic actuation loads to the divergent flap.

6 Claims, 5 Drawing Sheets

DIVERGENT FLAP ACTUATION SYSTEM FOR TWO-DIMENSIONAL CONVERGENT - DIVERGENT TURBOJET EXHAUST NOZZLE

This invention was made with Government support under Contract No. F33657-83-C-0281 awarded by the Department of the Air Force. The Government has certain rights in this invention.

BACKGROUND OF THE INVENTION

1. Field of the Invention

This invention relates generally to turbojet aircraft engines and particularly relates to a lightweight, space-efficient actuation system for varying the divergent flap exit area of a gas turbine engine nozzle.

2. Description of Prior Developments

Current jet aircraft engine performance requirements dictate that the divergent flap exit area of two-dimensional convergent-divergent (2DCD) exhaust nozzles be controlled independently of the nozzle throat area to allow corresponding nozzle area ratios to be independently adjusted for all nozzle pressure ratios. Thrust vectoring can be obtained with these nozzles, if desired, by operating the upper and lower divergent flaps independently.

A conventional approach to actuating 2DCD nozzle divergent flaps, such as divergent flaps 10 shown in FIG. 1, requires the mounting of linear actuators 12 on nozzle side walls 14. This arrangement further requires bellcranks 15 and torque tubes 16 provided with arms 18 to transmit the actuation force to the divergent flaps 10. Due to the large range of motion through which the divergent flaps 10 must travel, extremely long linear actuators are required. The long length of these actuators makes it difficult to package them within the exhaust nozzle without cutting through structural bulkheads 20 and other nozzle actuation linkages.

As further seen in FIG. 1, tracks 22 and sliders 24 are required for preventing rotation of the linear actuators 12. Rotation of the linear actuators is prevented in order to reduce the size of the bulkhead holes required for accommodating the linear actuators and for preventing flexure of the hydraulic lines coupled to the linear actuators. This external actuation hardware, i.e. the tracks 22, sliders 24 and linear actuators 12 makes packaging of other actuation hardware difficult, if not impossible.

Another prior approach uses rotary actuators instead of linear actuators and their associated linkages. Such a system is shown in FIG. 2. Hydraulic motors (not shown) located within torque tubes 16 transmit power through a planetary gear drive to provide driving torque to the torque tubes. Several actuation arms 18 are located between the outer flap 25 and divergent flap 10. Arms 18 are provided with rollers 26 to transmit the driving torque to the divergent flaps 10.

This approach solves the external hardware packaging problem noted previously, but was found to be extremely heavy due to the weight penalty inherent with gears. This weight problem presents a significant drawback in aircraft applications where weight reduction is critical. Moreover, rotary actuators are expensive and not as reliable as linear actuators due to their inherent complexity.

Accordingly, a need exists for a light weight, cost effective, space efficient, and reliable divergent flap actuation system which minimizes the loads applied to the forward hinges which secure the divergent flaps within the engine nozzle.

SUMMARY OF THE INVENTION

The present invention has been developed to fulfill the needs noted above and therefore has as a primary object the provision of a 2DCD divergent flap actuation system which is both lightweight and space efficient. The actuation system may be packaged entirely within a cavity formed between an outer flap and a divergent flap. Valuable space on and adjacent the nozzle sidewalls is thus saved to provide design flexibility for the actuation of other exhaust nozzle functions.

Briefly, the invention includes a pair of linear hydraulic actuators, each rotatably pinned at one end to a fixed nozzle support element and pinned at another end to a pivotable actuation frame. Rollers, which are mounted to the actuation frame, are guided upon tracks provided on the divergent flap. Upon receiving pressurized hydraulic fluid, the linear actuators extend in length and pivot about their pinned joints. This movement effects rotation of the actuation frame which in turn drives the rollers along the divergent flaps. Force from the linear actuators is thus transmitted to the divergent flaps via the actuation frame and rollers thereby resulting in pivotal actuation of the divergent flaps.

A particular advantage to this actuation system is the use of lightweight and short stroke linear actuators. Because compact short stroke linear actuators may be employed, the entire actuation system may be located between the outer flap of the nozzle and the internal divergent flap. This arrangement provides free space adjacent the nozzle side walls for additional actuation hardware.

Another significant feature of the invention is the transmission of force from the linear actuators to the divergent flaps via rolling contact. Actuation loads applied to the high temperature divergent flaps are thus applied normal to the flaps and therefore are of a magnitude only large enough to react the force of the exhaust gas.

Since no parasitic (non-normal) load is applied to the divergent flaps by the rollers, the force required to actuate these flaps at the nozzle throat is unaffected. The absence of parasitic loading on the divergent flaps provides an additional benefit in that the loading and wear of the divergent flap hinges is correspondingly reduced and the transmission of undesirable loads to the convergent flaps is thus avoided.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawing, like reference characters designate like parts.

DETAILED DESCRIPTION OF THE PREFERRED EMBODIMENT

Figure 1:
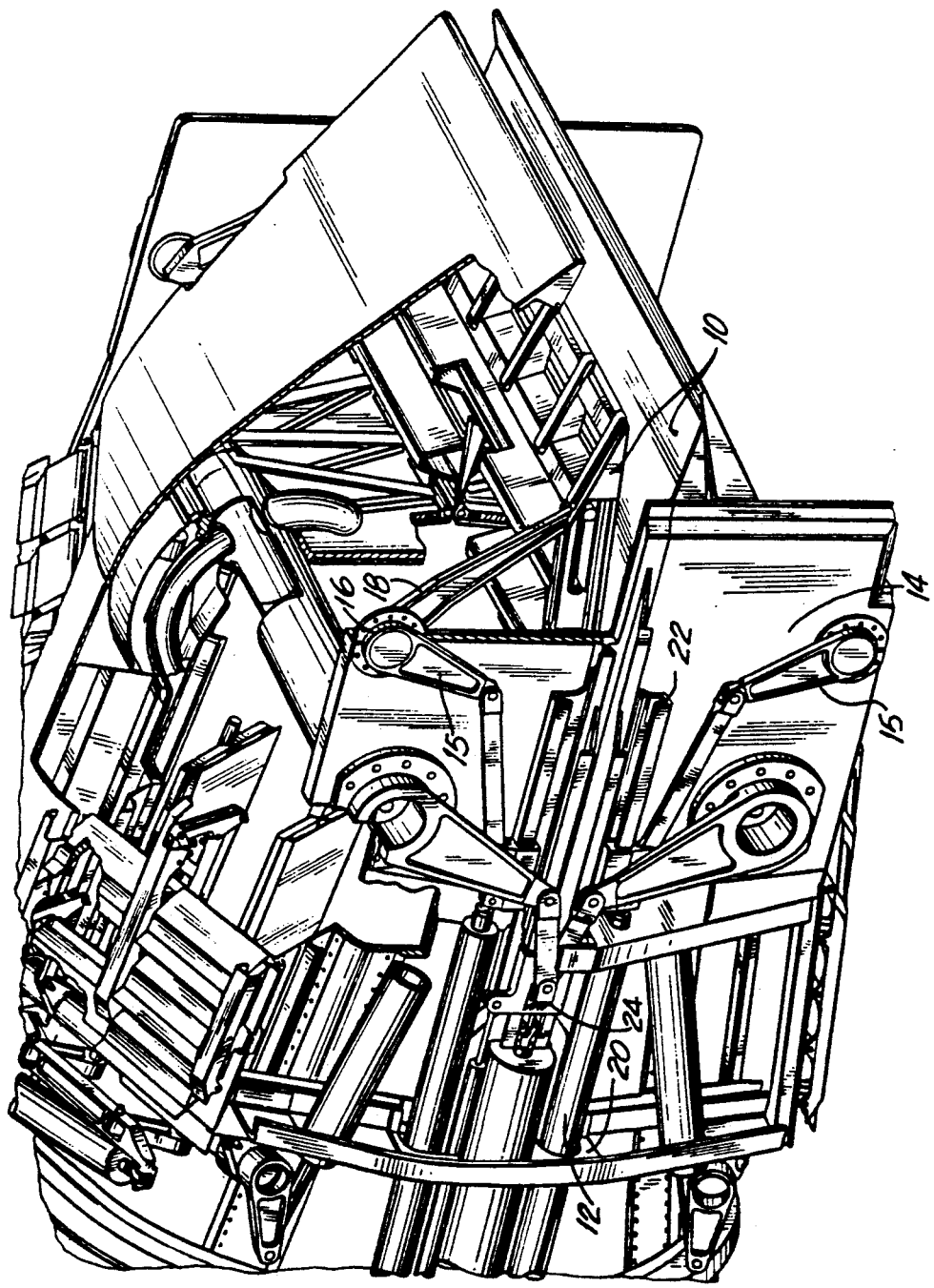
FIG. 1 is a fragmental partially sectioned perspective view of a divergent flap actuation system according to the prior art.
Figure 2:
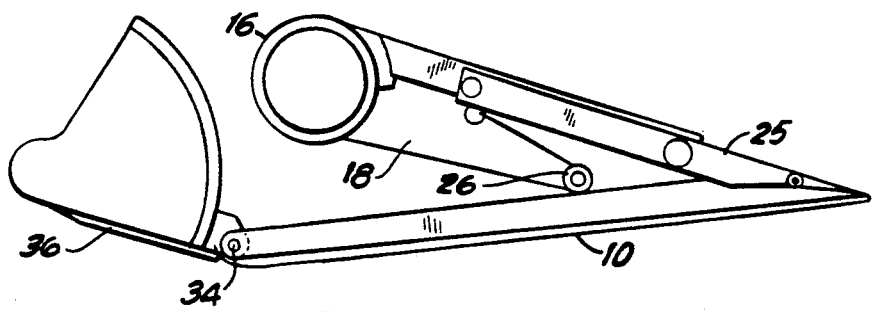
FIG. 2 is a schematic side elevation view of another conventional divergent flap actuation system using rotary actuators.
Figure 3:
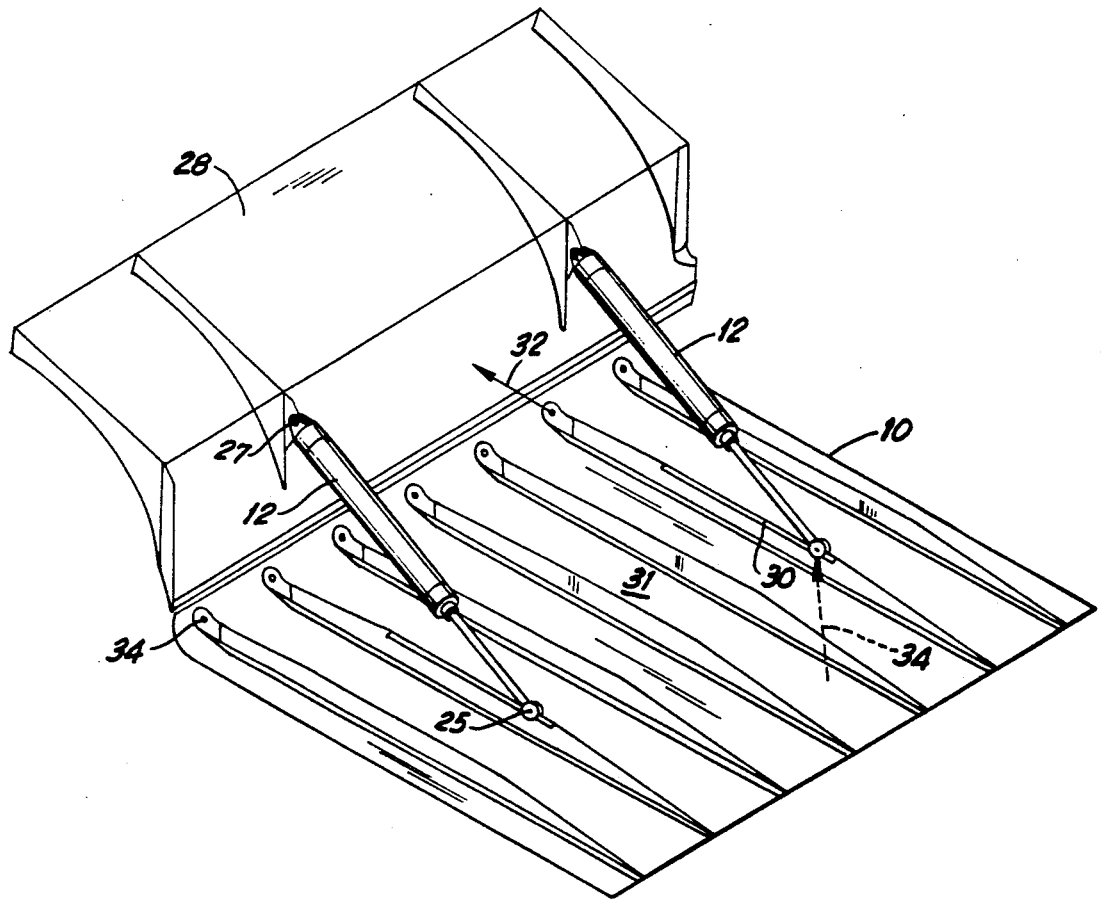
FIG. 3 is a schematic perspective view of an initial design of a divergent flap actuation system according to the invention wherein linear actuators are pinned directly to a divergent flap.

A precurser to the present invention is shown in FIG. 3. This prototype design involves pinning the linear actuators 12 to the divergent flaps 10 and to a static support structure 28 at pinned pivot joints 25, 27. Although being relatively simple, this design causes the convergent flap actuation force to increase due to the large parasitic load component 30 imparted parallel to the surface of the divergent flap base sheet 31. This parasitic load component 30 induces large loads 32 on the convergent/divergent flap forward hinge 34 which pivotally interconnects the divergent flaps 10 with convergent flaps 36 (FIG. 2). These parasitic loads are much larger than the gas loads 34 alone would produce. In addition, the required length of the actuator 12 is prohibitive in this design.

Figure 4:
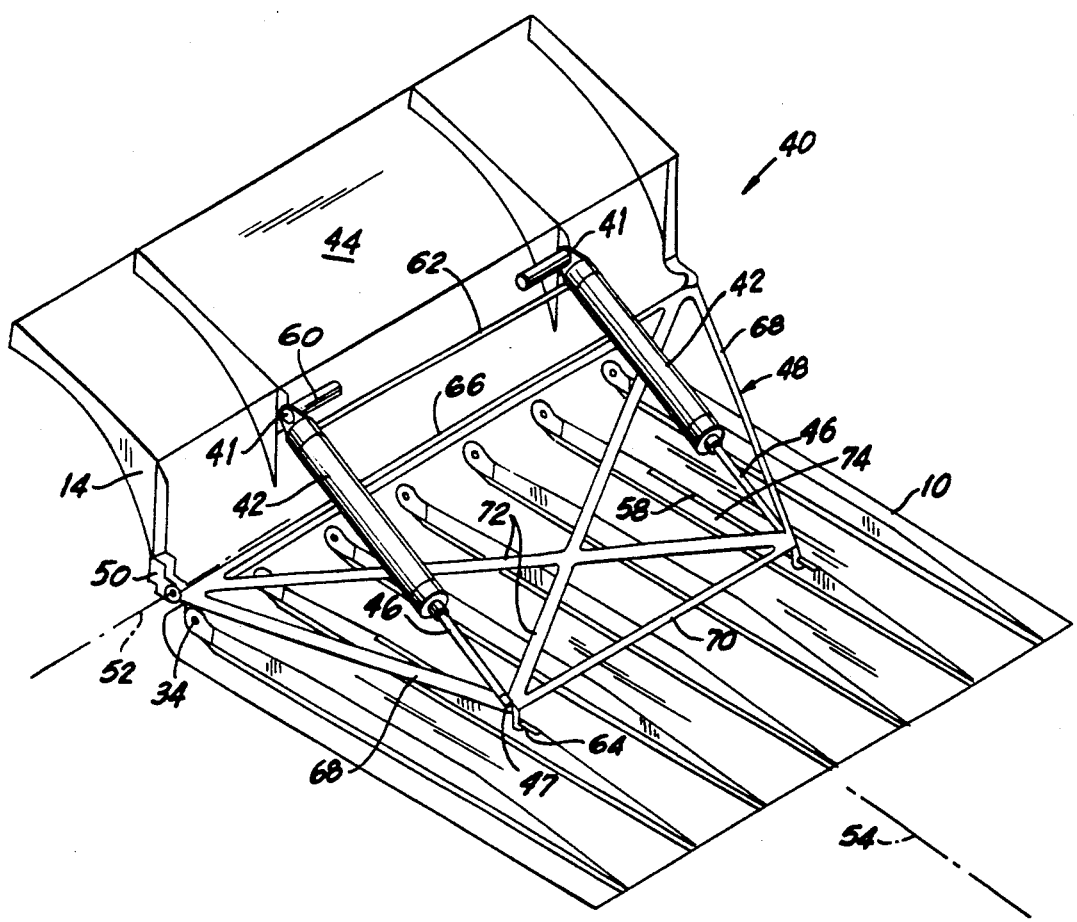
FIG. 4 is a schematic perspective view of an improved divergent flap actuation system according to the invention.

FIG. 4 depicts the basic components of an improved divergent flap actuation system 40. Although only the upper half of the actuation system is shown, it is to be understood that a similar system is typically provided for actuating the lower divergent flap. One or more linear actuators such as a pair of hydraulic cylinders 42 is pivotally pinned via clevis joints 41 at the head end of a fixed actuator support structure 44 which transversely spans the exhaust gas flow path and which may include fixed midstructure side walls 14. The rod ends 46 of the actuators 42 are pivotally pinned at pin joint 47 (FIG. 5) to an actuation frame or actuation member 48.

Actuation frame 48 is rotatably attached to the fixed side walls 14 of an exhaust nozzle at bearing housings 50. This arrangement allows the actuation frame to rotate about an axis 52 aligned perpendicular to the engine axial centerline 54. Rollers 56, which are rotatably housed in the actuation frame 48, contact and roll over two tracks 58 provided on the outer surface of each divergent flap 10. This rolling contact provides the force necessary to react the exhaust gas forces acting on the inner surfaces of the divergent flaps.

Rollers 56 (FIG. 5) impart forces to the divergent flaps 10 in a direction normal to the surfaces of the tracks 58. The remaining portion of the actuation force is then reacted by the actuation frame 48 into the side walls 14. This arrangement prevents the transfer of actuator load components to the hinge joints 34 and thereby prolongs their service life.

Because the actuation frame 48 is structurally separate from the divergent flaps 10 and engages the divergent flaps via rolling contact, no parasitic actuation load is transferred from the actuation frame to the divergent flaps. Furthermore, no parasitic actuation load is transferred from the divergent flaps 10 to the upstream convergent flaps, and thus the nozzle throat actuation load is unaffected by the actuation of the divergent flaps.

In light of the large angular rotation of each actuator 42 about its head end clevis 41, a rotary union 60 is required to provide hydraulic fluid to the actuators 42. A synch cable 62 is tensioned between the actuators 42 to provide increased rigidity and torsional resistance to the actuation frame 48 in the event that a load imbalance occurs between adjacent actuators 42. This imbalance can be caused by asymmetrical internal gas loads applied to the divergent flaps 10, asymmetrical outer flap air loads, or friction differences between actuator linkages and joints.

Actuation frame 48 is shown in FIG. 4 as a trapezoidal shaped tension and compression truss assembly. This design allows for a structurally efficient and lightweight configuration particularly suited for use in aircraft applications. Reverse load retainers 64 keep the divergent flaps 10 from disengaging from the actuation frame 48 during engine off operation, overexpansion, or aircraft maneuvers.

Actuation frame 48 further includes a transverse base member 66, a pair of side braces 68 extending from opposed ends to the base member 66 and an outer transverse support bar 70. A pair of cross braces 72 extend diagonally from the ends of the base member to the ends of the support bar 70 so as to provide added rigidity to the actuation frame 48.

Figure 5:
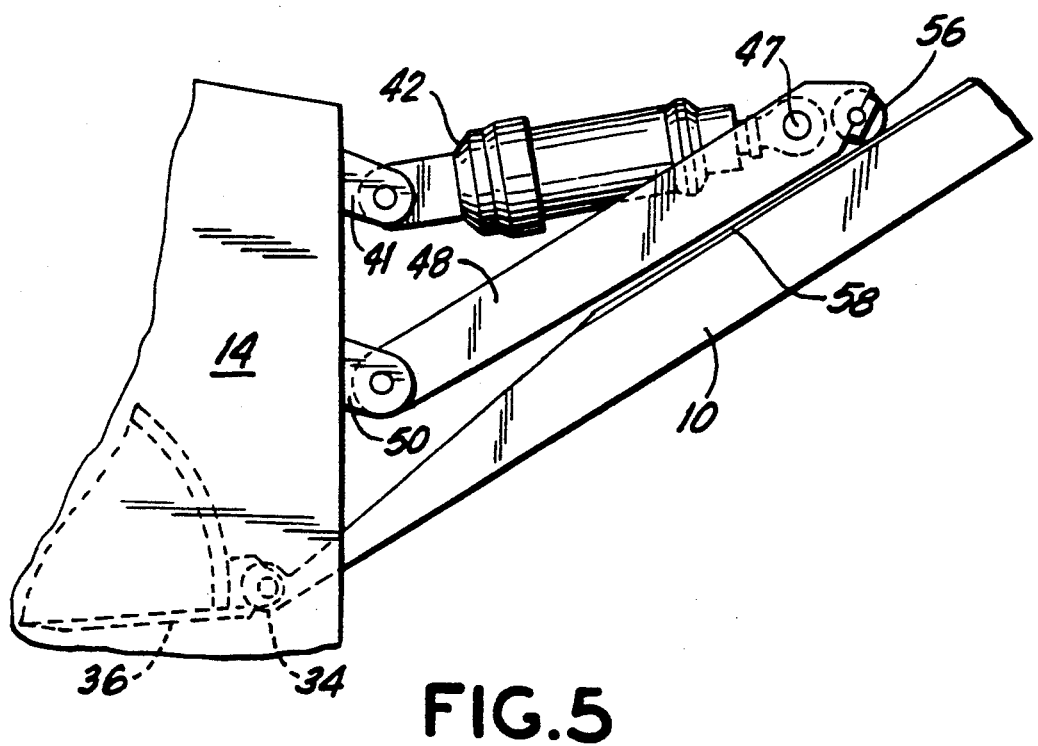
FIG. 5 is a schematic side elevation view of the actuation system of FIG. 4 wherein the divergent flap is disposed in its extreme upward position.
Figure 6:
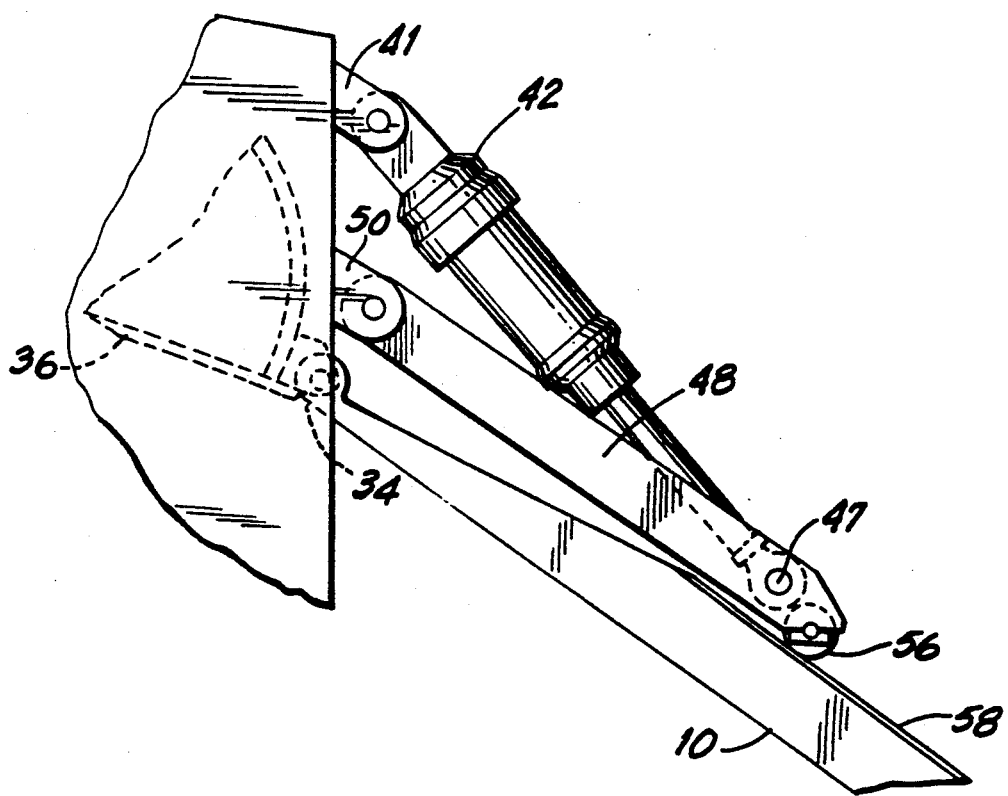
FIG. 6 is a fragmental side elevation view of the actuation system of FIG. 4 wherein the divergent flap is disposed in its extreme downward position.

Actuation of the upper divergent flap is shown in FIGS. 5 and 6 at its endpoints of movement. In FIG. 5, the actuation system is shown in its extreme retracted position while in FIG. 6 the actuation system is shown in its extreme extended position.

Figure 7:
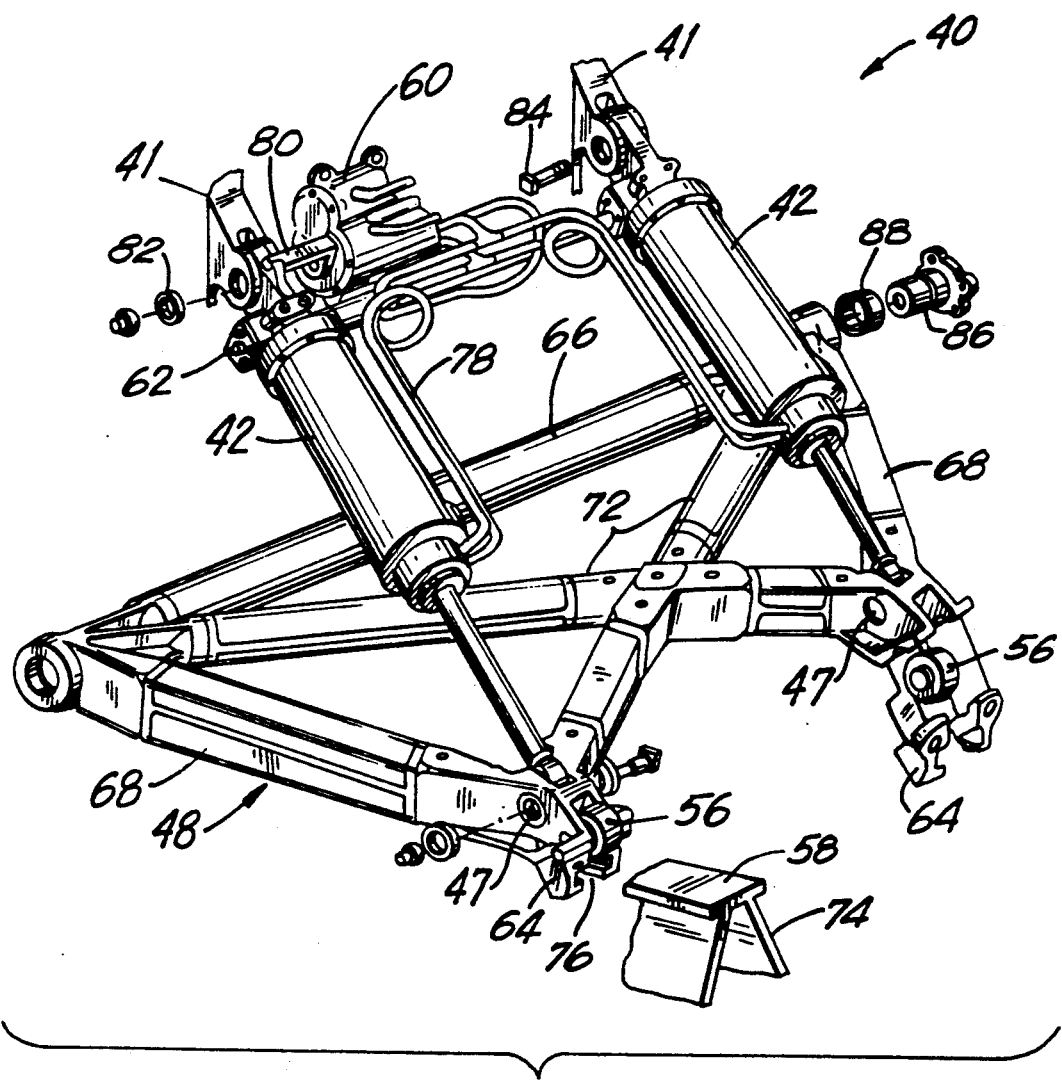
FIG. 7 is a fragmental perspective view showing details of the actuation system of FIG. 4.

Additional details of the actuation system 40 are shown in FIG. 7 wherein roller tracks 58 are formed on structural ribs 74 which extend axially along the outer surfaces of the divergent flaps 10. The reverse load retainers 64, which are mounted to actuation frame 48, are formed with channels or slots 76 for slidably receiving roller tracks 58.

The sync cable 62 may take the form of a synchronous flex drive shaft containing a hydraulic supply line for supplying hydraulic fluid to the actuators 42. Hydraulic return and drain lines 78 extend between the actuators 42 and rotary union 60. An actuator position linkage 80 adjacent clevis 41 interconnects the rotary union 60 and actuator 42.

The actuation system 40 is mounted to the side wall exhaust nozzle midstructure via spherical ball clamp bushings 82 and square head shoulder bolts 84 at clevis 41. A trunnion pin 86, which mounts to the midstructure of the exhaust nozzle, rotatably supports the actuation frame 48 via trunnion bushings 88.

There has been disclosed heretofore the best embodiment of the invention presently contemplated. However, it is to be understood that various changes and modifications may be made thereto without departing from the spirit of the invention. For example, actuation system 40 is applicable for use with any 2DCD nozzle with or without thrust vectoring. The actuation system can be used with either the upper or lower divergent flap if the other flap is fixed as in a single expansion ramp nozzle type configuration.

Moreover, control feedback approaches can be used with the actuation system including remotely mounted rotary voltage differential transducers (RVDT's) or remotely mounted linear voltage differential transducers (LVDT's) or LVDT's mounted internally within the linear actuators. The frame design shown can be modified in structural approach to make it adaptable to other cavity geometries. A virtually infinite combination of tension/compression members can be arranged in a trusslike fashion to produce the desired kinematic and load transfer behavior.

What is claimed is:

1. An apparatus for actuating a flap in a jet engine exhaust nozzle, comprising:
   at least one linear actuator disposed within said nozzle;
   an actuation member pivotally mounted within said nozzle and pivotally connected to said linear actuator wherein said actuation member comprises a truss frame; and
   rolling means provided on said actuation member, said rolling means engaging said flap via rolling contact so as to effect pivotal actuation of said flap within said nozzle;

2. The apparatus of claim 1, further comprising a support structure fixed within said nozzle and wherein said linear actuator is pivotally mounted at one end to said support structure and pivotally mounted at an opposed end to said actuation member.

3. The apparatus of claim 2, wherein said actuation member is pivotally mounted to said support structure.

4. The apparatus of claim 1, wherein said actuation member comprises means for preventing said actuation member from disengaging said flap.

5. An apparatus for actuating a flap in a jet engine exhaust nozzle, comprising:
   at least one linear actuator disposed within said nozzle, wherein said at least one linear actuator comprises a pair of linear actuators, and wherein said apparatus further comprises tension means tensioned between said pair of linear actuators for providing rigidity to said apparatus;
   an actuation member pivotally mounted within said nozzle and pivotally connected to said linear actuator; and
   rolling means provided on said actuation member, said rolling means engaging said flap via rolling contact so as to effect pivotal actuation of said flap within said nozzle.

6. An apparatus for actuating a divergent flap within a two-dimensional convergent-divergent turbojet exhaust nozzle, comprising:
   a support structure fixed within said nozzle;
   a pair of linear actuators pivotally mounted at a first end thereof to said support structure;
   an actuation frame pivotally mounted at a first end thereof to said support structure, said linear actuators being joined at a second end thereof to said divergent flap and to a second end of said actuation frame;
   a pair of rollers rotatably mounted to said actuation frame; and
   means provided on said divergent flap for engaging said rollers.

* * * * *